(12) United States Patent
Yu et al.

(10) Patent No.: US 8,023,824 B2
(45) Date of Patent: Sep. 20, 2011

(54) WAVELENGTH DIVISION MULTIPLEXED PASSIVE OPTICAL NETWORK

(75) Inventors: Jianjun Yu, Princeton, NJ (US); Yuanqiu Luo, East Windsor, NJ (US); Junqiang Hu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 664 days.

(21) Appl. No.: 12/115,046

(22) Filed: May 5, 2008

(65) Prior Publication Data

US 2008/0279556 A1    Nov. 13, 2008

Related U.S. Application Data

(60) Provisional application No. 60/916,335, filed on May 7, 2007.

(51) Int. Cl.
*H04J 14/00* (2006.01)
*H04B 10/00* (2006.01)

(52) U.S. Cl. .......................................... 398/72; 398/170

(58) Field of Classification Search .................... 398/58, 398/67, 70, 72, 162, 168–170, 175, 176, 398/188
See application file for complete search history.

(56) References Cited

U.S. PATENT DOCUMENTS

| | | | |
|---|---|---|---|
| 2007/0165688 A1* | 7/2007 | Lee et al. | 372/71 |
| 2009/0185804 A1* | 7/2009 | Kai et al. | 398/48 |
| 2009/0201564 A1* | 8/2009 | Tian et al. | 359/239 |

OTHER PUBLICATIONS

Oladeji, Akanbi, et al., "A New Scheme for Bidirectional WDM-PON Using Upstream and Downstream Channels Generated by Optical Carrier Suppression and Separation Technique", IEEE Photonics Technology Letters, vol. 18, No. 2, pp. 340-342, Jan. 15, 2006.

Chan, L. Y., et al., "Upstream Traffic Transmitter Using Injection-Locked Fabry-Perot Laser Diode as Modulator for WDM Access Networks", Electronic Letters, vol. 38, No. 1, pp. 43-45, Jan. 3, 2002.

Yu, Jianjun, et al., "A Novel Technique for Optical Label and Payload Generation and Multiplexing Using Optical Carrier Suppression and Separation", IEEE Photonics Technology Letters, vol. 16, No. 1, pp. 320-322, Jan. 2004.

(Continued)

*Primary Examiner* — Shi K Li
(74) *Attorney, Agent, or Firm* — Joseph Kolodka

(57) ABSTRACT

Data is transmitted between a central office and customer premises by a wavelength division multiplex passive optical network. Two laser beams with separate wavelengths are transmitted from the central office to an optical network unit in the customer premises. Both laser beams carry downstream data. One laser beam is intensity modulated by on/off keying. The other laser beam is phase modulated by differential phase shift keying, which maintains a constant optical intensity. The first laser beam is received by a first optical receiver, which demodulates the first downstream data. The second laser beam is split in two. One laser beam is sent to a second optical receiver, which demodulates the second downstream data. The other laser beam is sent to a reflective semiconductor amplifier, which modulates the beam with upstream data and transmits the beam back to a receiver in the central optical system.

20 Claims, 10 Drawing Sheets

OTHER PUBLICATIONS

Xu, L., et al., "An Integrated Transceiver Based on a Reflective Semiconductor Optical Amplifier for the Access Network", Proc. Symp. IEEE/LEOS Benelux Chapter, pp. 77-80, Eindhoven, 2006.

Hung, Wai, et al., "An Optical Network Unit for WDM Access Networks with Downstream DPSK and Upstream Remodulated OOK Data Using Injection-Locked FP Laser", IEEE Photonics Technology Letters, vol. 15, No. 10, pp. 1476-1478, Oct. 2003.

Huang, Ming-Fang, "A Novel WDM-PON Using Simultaneously Generated DPSK and OOK Centralized Lightwaves for Future Multi-Services in Access Networks", ECOC 2007, paper 10.6.4.

* cited by examiner

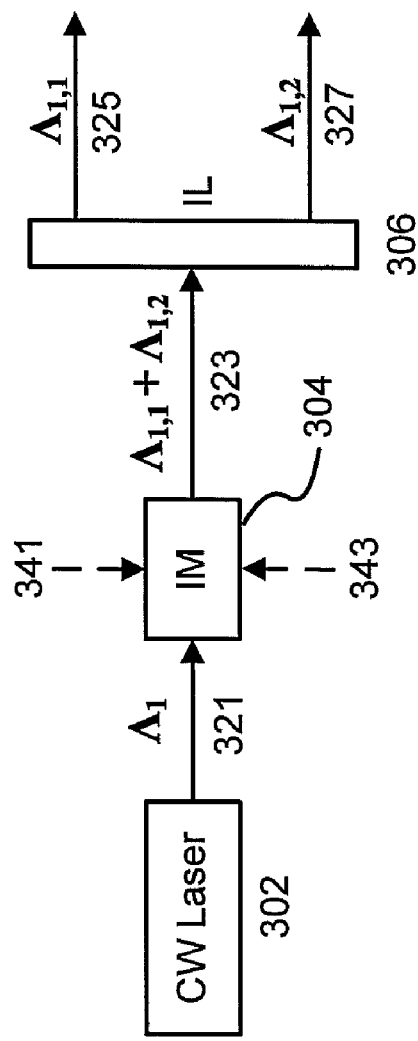
FIG. 3(a)
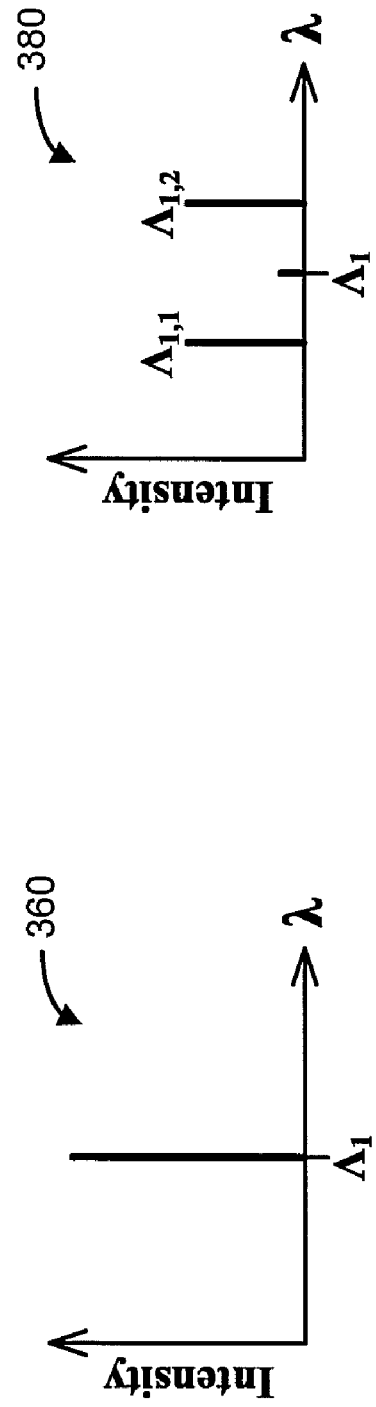
FIG. 3(c)
FIG. 3(b)

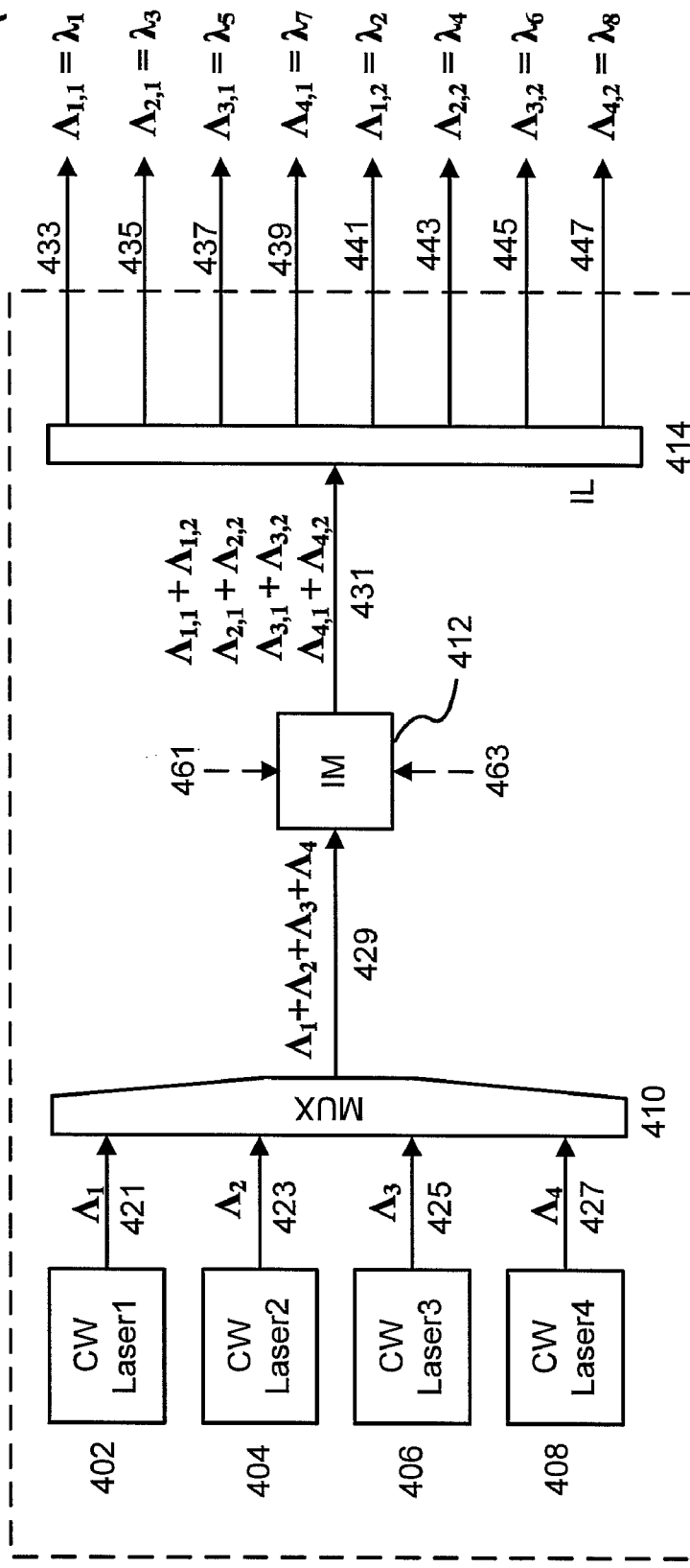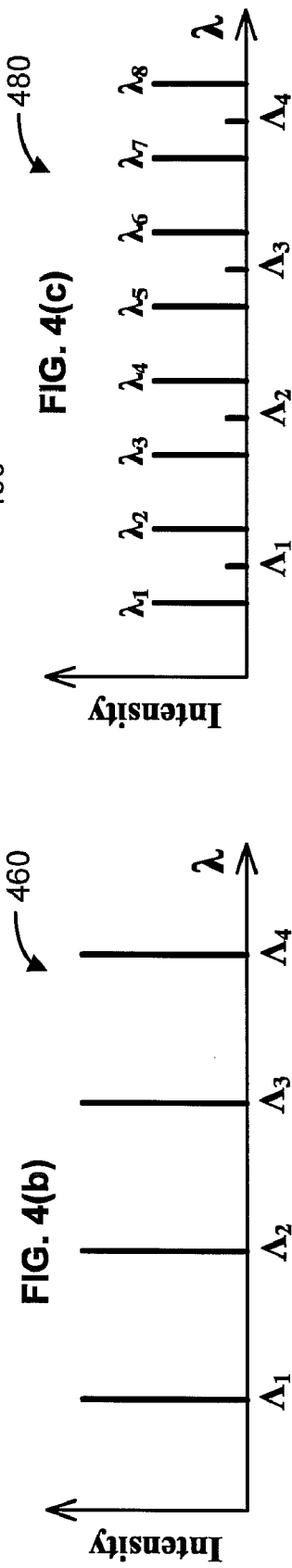

WAVELENGTH DIVISION MULTIPLEXED PASSIVE OPTICAL NETWORK

This application claims the benefit of U.S. Provisional Application No. 60/916,335 filed May 7, 2007, which is incorporated herein by reference.

BACKGROUND OF THE INVENTION

The present invention relates generally to fiber optic transmission systems, and more particularly to wavelength division multiplexed passive optical networks.

Fiber optics is a reliable technology for high-speed packet data transmission in telecommunications networks. It has been extensively deployed in core networks, in which the network equipment is typically installed in controlled environments. Environmental variables, such as temperature, humidity, vibration, and shock, are typically regulated according to industry standards. In addition, these installations typically have reliable power sources, including battery backup.

Multimedia services (data, voice, and video) are increasingly being provided over packet data networks. These services require high-speed communication links between customers' equipment and the core network. Furthermore, high-speed bi-directional communication links are increasingly in demand. Previously, for example, video was primarily downloaded from a server to a customer. Now, however, a customer may also desire to upload videos from his home computer to a network server or to another customer's home computer.

Communications links from a customer to an access network have primarily been provided over twisted-pair wires (to the local telephone exchange) or over coax cable (to the cable television network). Optical fiber, however, has inherently higher bandwidth than twisted-pair wires and coax cable, and, indeed, service providers are deploying fiber all the way to the customer location. Depending on the customer, service offerings are variously referred to as fiber-to-the-office, fiber-to-the-building, fiber-to-the-business, and fiber-to-the-home. Herein, the generic term fiber-to-the-premises (FTTP) is used, where premises refer to customer premises. FTTP, however, often requires installation of equipment in outside plant, which is typically exposed to uncontrolled environments. Supplying reliable power to outside plant is also more difficult and expensive than supplying reliable power to a central office, for example. Furthermore, since communications links are geographically dispersed over many customers, management of the distribution plant is more difficult than management of the infrastructure of a central office, for example. What are needed are method and apparatus for deploying a low-cost network infrastructure for FTTP services.

BRIEF SUMMARY OF THE INVENTION

In an embodiment, data is transmitted and received across a wavelength division multiplex passive optical network by generating, at a central optical system, a first laser beam with a first wavelength and a second laser beam with a second wavelength. The first laser beam is modulated with first downstream data. The second laser beam is modulated with second downstream data. Modulation of the first optical beam may be by intensity modulation, phase modulation, or other modulation. Modulation of the second laser beam may be done by phase modulation or other modulation which maintains the intensity of the second laser beam at a constant value. The two laser beams are transmitted to an optical network unit. The first optical beam is sent to a first optical receiver, which demodulates the first downstream data. The second laser beam is split into two laser beams. One of the split laser beams is transmitted to a second optical receiver, which demodulates the second downstream data. The second split laser beam is transmitted to a reflective semiconductor optical amplifier, which modulates the second split laser beam with upstream data. The laser beam modulated with upstream data is reflected by the reflective semiconductor optical amplifier and transmitted to an optical receiver in the central optical system. The receiver demodulates the upstream data.

These and other advantages of the invention will be apparent to those of ordinary skill in the art by reference to the following detailed description and the accompanying drawings.

BRIEF DESCRIPTION OF THE DRAWINGS

FIG. 3(a)-FIG. 3(c) show a block diagram of a single optical carrier suppression and separation source and its related spectra;

FIG. 4(a)-FIG. 4(c) show a block diagram of an array of optical carrier suppression and separation sources and its related spectra;

DETAILED DESCRIPTION

Figure 1:
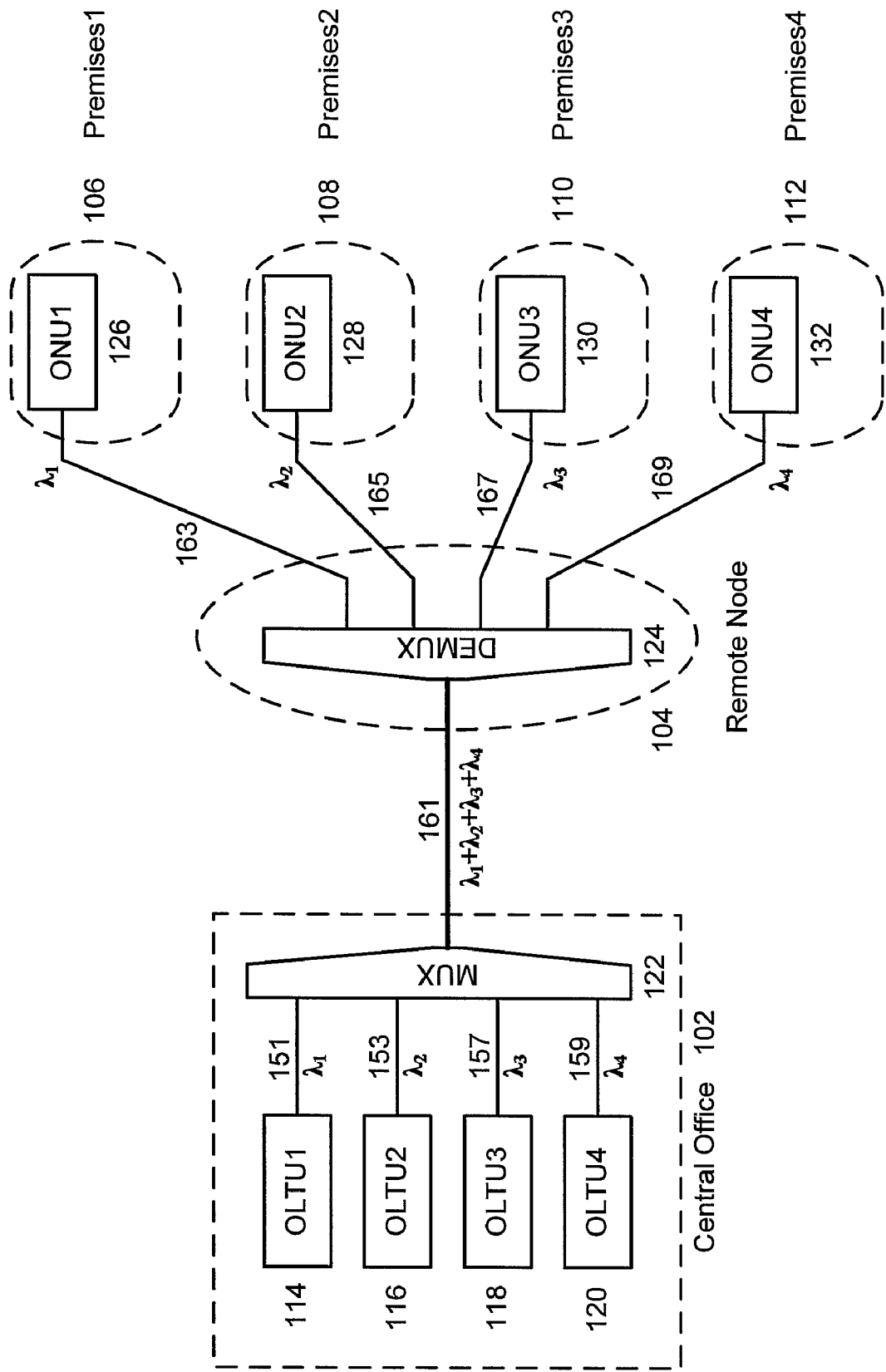
FIG. 1 shows a high-level schematic of a unidirectional fiber-to-the-premises distribution network.

Shown in FIG. 1 is a high-level schematic of an example of a FTTP network based on wavelength division multiplexing. The primary locations involved are the central office 102, the remote node 104, and premises1 106-premises4 112. The example shows a single remote node and four premises. In general, multiple remote nodes may be serviced by a single central office, and multiple premises may serviced by a single remote node. Remote node 104 is also referred to as a neighborhood node, which services the neighborhood comprising premises1 106 to premises4 112. As discussed above, central office 102 typically has a well-regulated environment and reliable power sources. The remote node 104, however, is typically installed in outdoor plant.

For simplicity, FIG. 1 shows an example of a network providing uni-directional services, in which data is transported downstream from the central office 102 to premises1 106—premises4 112. Examples of networks providing bidirectional services are discussed below. To simplify the terminology, herein, the term data is used to include voice and video. Downstream refers to data transport from the central office to the customer. Upstream refers to data transport from the customer to the central office. In the central office 102 are optical line terminal units (optical transceivers) OLTU1 114-OLTU4 120, which emit optical beams, such as single wavelength laser beam 151-single wavelength laser beam 159. The corresponding wavelengths are $\lambda_1$-$\lambda_4$, respectively. Herein, laser beams refer to optical beams, which may include optical beams from non-laser sources.

Laser beam 151-laser beam 159 are multiplexed by multiplexer 122 to form multi-wavelength laser beam 161, which is transported across optical fiber to remote node 104. There, multi-wavelength laser beam 161 is demultiplexed by demultiplexer 124 into individual single wavelength laser beam 163-single wavelength laser beam 169, with wavelengths $\lambda_1$-$\lambda_4$, respectively. The optical transceiver within a premises is referred to as an optical network unit (ONU). An example of an ONU is a fiber modem. Each customer is assigned an optical communications channel (optical channel) over an individual wavelength. Laser beam 163-laser beam 169 are transported across optical fibers to ONU1 126-ONU4 132, respectively.

As discussed above, remote node 104 is typically installed in outside plant. In some FTTP networks, remote node 104 is a passive optical node, in which there are no active electronic components, such as optoelectronic transceivers or electronic amplifiers. The corresponding network is referred to as a passive optical network (PON). In a PON, no power is required to be supplied to remote node 104, thus reducing installation, provisioning, and maintenance costs. Also, in general, in an uncontrolled environment, active electronic components are more prone to failure than passive optical components.

Figure 2:
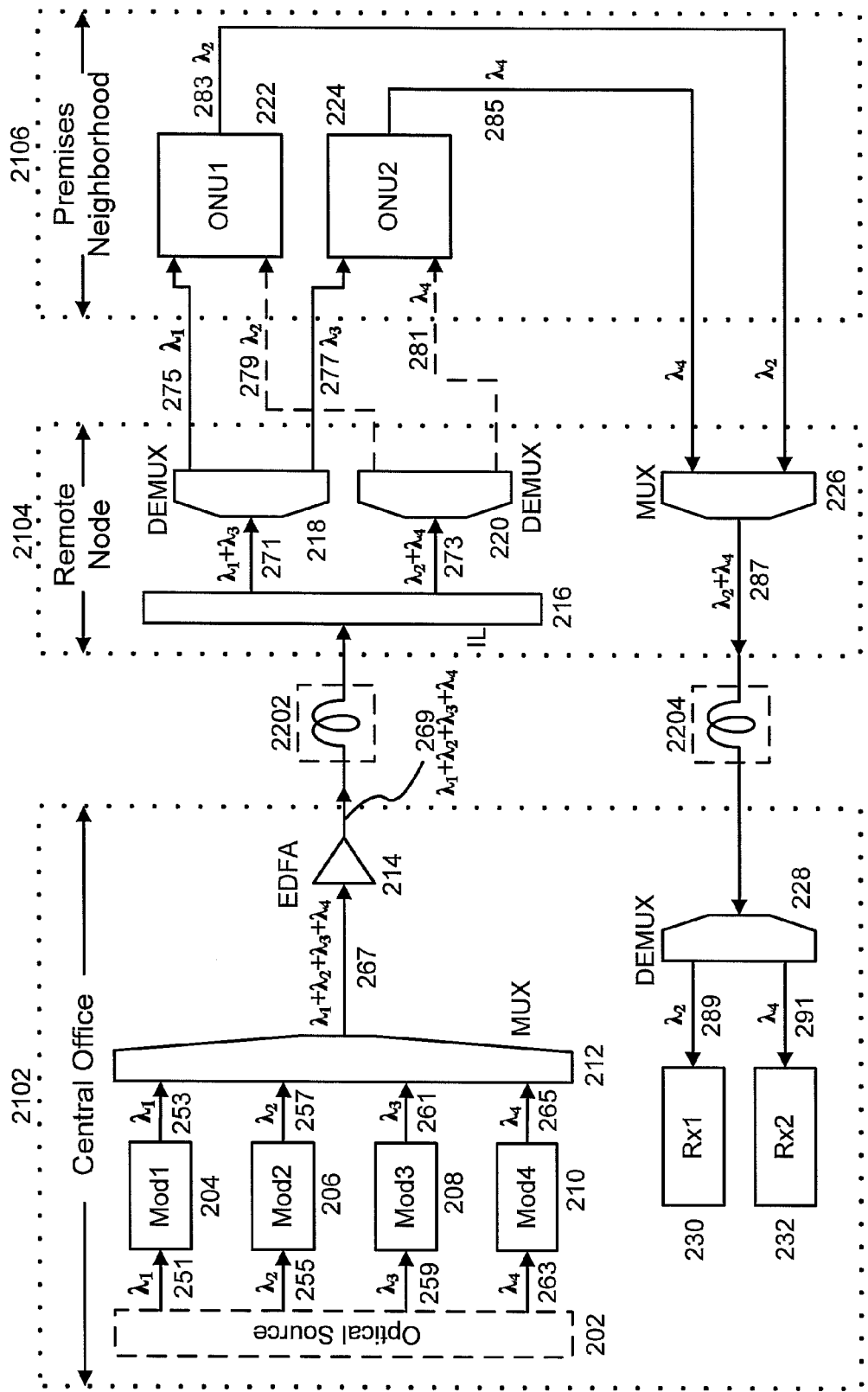
FIG. 2 shows a high-level schematic of a bidirectional wavelength division multiplex passive optical network.

Shown in FIG. 2 is a high-level schematic of a wavelength division multiplex passive optical network (WDM-PON) providing bi-directional data transport. More detailed embodiments are discussed below. Herein, the communications system within the central office 2102 is referred to as the central optical system. In the central office 2102, multi-wavelength optical source 202 emits four continuous wave (CW) single wavelength laser beams, laser beam 251-laser beam 263, with corresponding wavelengths $\lambda_1$-$\lambda_4$, respectively. Laser beam 251-laser beam 263 are modulated by modulators Mod1 204-Mod4 210, respectively, to yield modulated laser beam 253-modulated laser beam 265, respectively. As described below, Mod1 204-Mod4 210 may, for example, be intensity modulators or phase modulators. Modulation is controlled by an RF drive signal (not shown in the figure) applied to a modulator. Data is encoded and carried on the RF drive signal.

A single optical channel is assigned to each wavelength. Wavelength $\lambda_1$ and wavelength $\lambda_3$ correspond to odd channels. Wavelength $\lambda_2$ and wavelength $\lambda_4$ correspond to even channels. The CW laser beams, laser beam 251-laser beam 263, are optical carriers. The modulated laser beams, laser beam 253-laser beam 265, carry signals with encoded data. Examples of modulation schemes are discussed below.

In one embodiment, optical source 202 is an optical carrier suppression and separation (OCSS) source, which is discussed in further detail below. In another embodiment, optical source 202 is a bank of four separate CW single wavelength ($\lambda_1$-$\lambda_4$, respectively) lasers. For improved performance and reliability, each CW single wavelength may be stabilized with a wavelength lock. In another embodiment, optical source 202 and modulators Mod1 204-Mod4 210 may be replaced by a bank of four directly modulated single wavelength ($\lambda_1$-$\lambda_4$, respectively) lasers.

Laser beam 253-laser beam 265 are multiplexed by multiplexer MUX 212 to form multi-wavelength ($\lambda_1+\lambda_2+\lambda_3+\lambda_4$) laser beam 267, which is amplified by erbium-doped fiber amplifier EDFA 214. The amplified multi-wavelength laser beam 269 is transmitted across optical fiber 2202 to optical interleaver IL 216, located in remote node 2104. Optical interleaver IL 216 separates laser beam 269 into laser beam 271, which contains odd channels $\lambda_1$ and $\lambda_3$, and laser beam 273, which contains even channels $\lambda_2$ and $\lambda_4$. Laser beam 271 is demultiplexed by demultiplexer DEMUX 218 into two laser beams, laser beam 275 with wavelength $\lambda_1$ and laser beam 277 with wavelength $\lambda_3$. Laser beam 275 is transmitted to optical network unit ONU1 222, located in premises neighborhood 2106. Laser beam 277 is transmitted to ONU2 224, also located in premises neighborhood 2106. Laser beam 273 is demultiplexed by demultiplexer DEMUX 220 into two laser beams, laser beam 279 with wavelength $\lambda_2$ and laser beam 281 with wavelength $\lambda_4$. Laser beam 279 is transmitted to ONU1 222. Laser beam 277 is transmitted to ONU2 224.

In the embodiment shown in FIG. 2, downstream data is transported to ONU1 222 via two optical channels (laser beam 275 and laser beam 279) for higher bandwidth. Similarly, downstream data is transported to ONU2 224 via two optical channels (laser beam 277 and laser beam 281). Upstream data is transported from ONU1 222 via a single optical channel (laser beam 283), which reuses the optical carrier $\lambda_2$. Similarly, upstream data is transported from ONU2 224 via a single optical channel (laser beam 285), which reuses the optical carrier $\lambda_4$. By reusing a downstream optical carrier as an upstream optical carrier, the upstream optical carrier is controlled from the central office, thus avoiding the need for a stabilized laser transmitter in the ONU. Since ONUs are to be mass deployed, low cost ONUs are advantageous for commercial rollout of FTTP services. In another embodiment, downstream data is transported via a single optical channel. A second unmodulated optical carrier is transmitted from the central office to an ONU for transmission of upstream data. Details of an ONU are discussed below.

Laser beam 283 and laser beam 285 are transmitted to multiplexer MUX 226, located in remote node 2104. Multi-wavelength ($\lambda_2+\lambda_4$) laser beam 287 is transmitted from the output of DEMUX 226 across optical fiber 2204 to demultiplexer DEMUX 228 (located in the central office 2102), which demultiplexes laser beam 287 into two single wavelength laser beams. Laser beam 289 ($\lambda_2$) is transmitted to receiver Rx1 230, which demodulates the optical signal carrying the encoded upstream data from ONU1 222. Similarly, laser beam 291 ($\lambda_4$) is transmitted to receiver Rx2 232, which demodulates the optical signal carrying the encoded upstream data from ONU2 224.

In the example shown in FIG. 2, two ONUs are serviced by remote node 2104. Each ONU has two downstream channels and a single upstream channel, which reuses one of the downstream optical channel wavelengths. In general, remote node 2104 services N ONUs. Optical source 202 transmits 2N optical channels: a set of N even channels and a set of N odd channels. Each ONU receives two downstream channels, an even channel and an odd channel. Each ONU transmits a single upstream channel, which reuses the same wavelength as the downstream even channel. Multiplexer MUX 226 in remote node 2104 then multiplexes N upstream channels into a multi-wavelength laser beam, which is transmitted across optical fiber 2204 to central office 2102. Demultiplexer DEMUX 228 demultiplexes the multi-wavelength laser beam into N single wavelength laser beams, each of which is transmitted to a separate receiver.

In other embodiments, each ONU may receive downstream data on one or more optical channels. Each ONU may also transmit upstream data on one or more optical channels. The number of optical channels (downstream or upstream) need not be equal for all ONUs. Thus, bandwidth may be allocated according to the application. For example, videoon-demand installations may require higher downstream bandwidth than upstream bandwidth.

As discussed above, in an embodiment, optical source 202 is an optical carrier suppression and separation (OCSS) source. Details of this source are shown in FIG. 3(a)-FIG. 3(c) and FIG. 4. A single OCSS source is shown in FIG. 3(a). Continuous wave (CW) laser 302 emits a constant intensity single wavelength laser beam 321 with a wavelength $\Lambda_1$ (called the carrier wavelength). In FIG. 3(b), the output spectrum (intensity vs. wavelength λ) of laser beam 321 is shown pictorially in plot 360. Laser beam 321 is transmitted through intensity modulator IM 304, which may, for example, be a dual-arm lithium niobate intensity modulator.

The transmittance of an intensity modulator is a function of an applied electrical drive signal. In FIG. 3(a), two sinusoidal (voltage as a function of time) radio-frequency (RF) drive signals, RF drive signal 341 and RF drive signal 343, are applied to IM 304. The RF drive signals are generated by an RF generator (not shown in the figure). RF drive signal 341 provides a clock signal with frequency $f_0$. RF drive signal 343 provides the complementary clock signal at frequency $f_0$. Input laser beam 321 is transmitted through IM 304 and is modulated by RF drive signal 341 and RF drive signal 343. Output laser beam 323 has two wavelengths, $\Lambda_{1,2}$ and $\Lambda_{1,2}$, as shown in output spectrum plot 380 (FIG. 3(c)). Note that the carrier at wavelength $\Lambda_1$ is suppressed. Let the frequencies $f_1$, $f_{1,1}$, and $f_{1,2}$ correspond to the wavelengths $\Lambda_1$, $\Lambda_{1,1}$, and $\Lambda_{1,2}$, respectively. The relationship of the wavelengths in output laser beam 323 are determined by $f_{1,1}=f_1+f_0$ and $f_{1,2}=f_1-f_0$.

Dual-wavelength laser beam 323 is then transmitted through an optical filter, which demultiplexes dual-wavelength laser beam 323 into two single wavelength laser beams: laser beam 325 with wavelength $\Lambda_{1,1}$ and laser beam 327 with wavelength $\Lambda_{1,2}$. In the example shown in FIG. 3(a), the optical filter is optical interleaver IL 306. Other optical filters may be used, such as an arrayed waveguide grating.

FIG. 4 shows a multi-laser array OCSS source 400, which includes four CW lasers, CW laser1 402-CW laser4 408, emitting single wavelength laser beam 421-single wavelength laser beam 427, respectively. The wavelengths of laser beam 421-laser beam 427 are $\Lambda_1$-$\Lambda_4$, respectively. Laser beam 421-laser beam 427 are multiplexed by multiplexer MUX 410 into multi-wavelength ($\Lambda_1+\Lambda_2+\Lambda_3+\Lambda_4$) laser beam 429, which is modulated by intensity modulator IM 412. The transmittance of IM 412 is modulated by sinusoidal RF drive signal 461 and sinusoidal RF drive signal 463. The RF drive signals are generated by an RF generator (not shown in the figure). RF drive signal 461 provides a clock signal with frequency $f_0$. RF drive signal 463 provides the complementary clock signal at frequency $f_0$. The output of IM 412 is multi-wavelength laser beam 431 which contains eight wavelengths, $\Lambda_{1,1}, \Lambda_{1,2}, \Lambda_{2,1}, \Lambda_{2,2}, \Lambda_{3,1}, \Lambda_{3,2}, \Lambda_{4,1}, \Lambda_{4,2}$. For simplicity, these wavelengths are relabelled $\lambda_1$-$\lambda_8$, respectively.

The output spectrum of multi-wavelength laser beam 429 is shown in plot 460 (FIG. 4(b)). An optical channel is assigned to each wavelength. In one embodiment, the frequency interval between the optical channels is 10 GHz, and the clock frequency is $f_0=25$ GHz. The output spectrum of multi-wavelength laser beam 431 is shown in plot 480 (FIG. 4(c)). The carriers at $\Lambda_1$-$\Lambda_4$ are suppressed. The output channels $\lambda_1$-$\lambda_8$ are equally spaced with a frequency interval of 50 GHz. Multi-wavelength laser beam 431 is then transmitted through optical interleaver IL 414, which demultiplexes laser beam 431 into a set of 8 laser beams (laser beam 433-laser beam 447), which may be divided into a set of 4 odd channels ($\lambda_1, \lambda_3, \lambda_5, \lambda_7$) and a set of 4 even channels ($\lambda_2, \lambda_4, \lambda_6, \lambda_8$).

In general, an OCSS array may include N CW lasers with a frequency interval $\Delta f$. If the clock frequency is $f_0=\Delta f/4$, then the output spectrum comprises 2N channels with a frequency interval of $\Delta f/2$. The 2N channels may be divided by an optical interleaver into a set of N odd channels and a set of N even channels.

Figure 5:
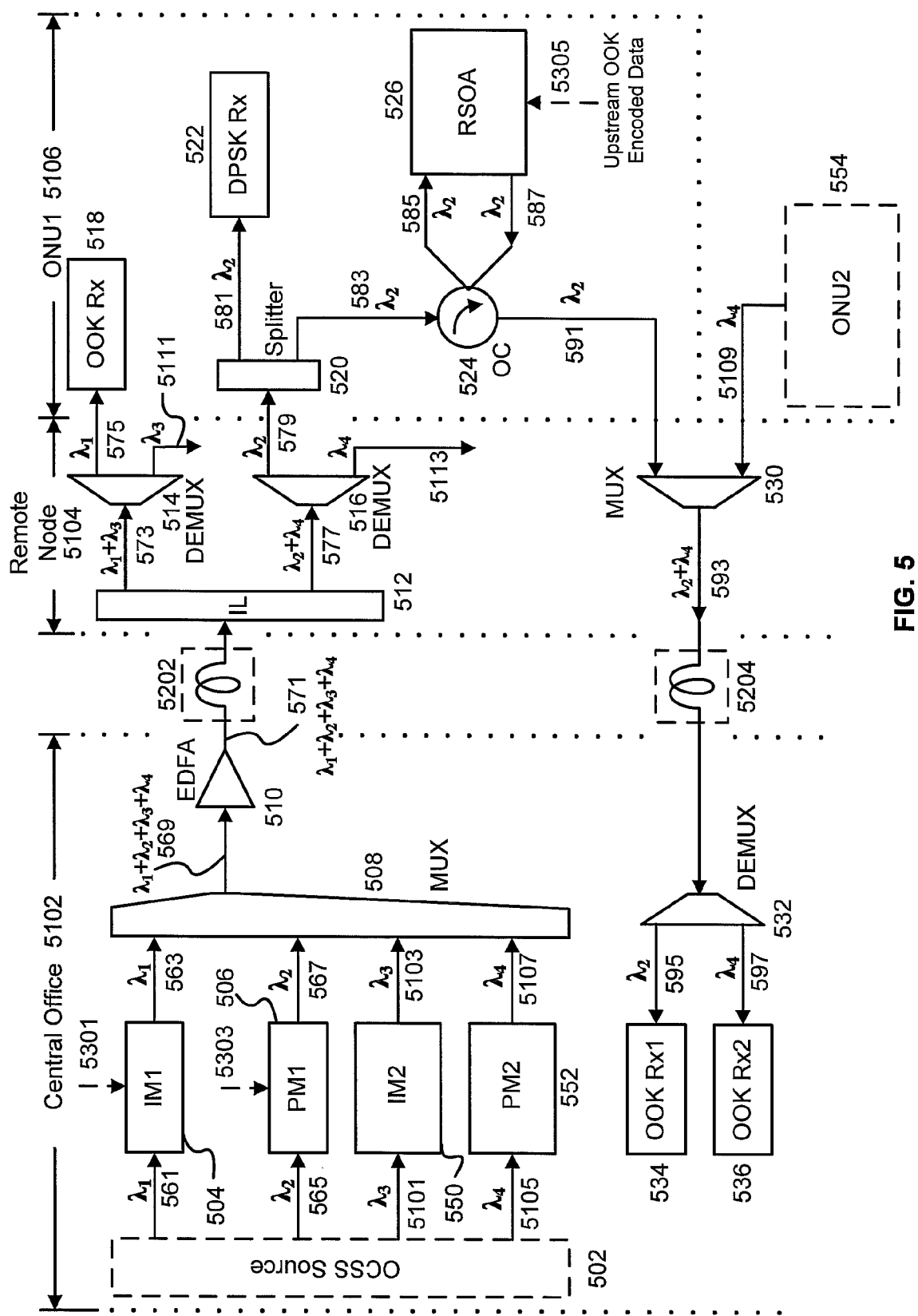
FIG. 5 shows a detailed schematic of a bidirectional wavelength division multiplex passive optical network using separate optical fibers for downstream and upstream data transport.

FIG. 5 shows an embodiment of a WDM-PON in accordance with the network architecture shown in FIG. 2. For simplicity, data transport is shown in detail only for ONU1 222 (relabelled as ONU1 5106 in FIG. 5). The components and optical connections are similar for ONU2 224 (relabelled as ONU2 554 in FIG. 5). In central office 5102, OCSS source 502 emits laser beam 561 ($\lambda_1$), laser beam 565 ($\lambda_2$), laser beam 5101 ($\lambda_3$), and laser beam 5105 ($\lambda_4$). Laser beam 561 and laser beam 565 are assigned to ONU1 5106, details of which are discussed below. Laser beam 5101 and laser beam 5105 are assigned to ONU2 554. Processing for ONU2 554 is similar to processing for ONU1 5106. Therefore, details for ONU2 554 are not discussed below, except where necessary for clarification of the various optical paths.

Laser beam 561 is transmitted through intensity modulator IM1 504. One downstream data stream is encoded by on/off key (OOK) modulation scheme. The OOK encoded downstream data is carried on RF drive signal 5301, which is used to modulate the transmittance of IM1 504. The output of IM 504 is laser beam 563, which carries the OOK encoded downstream data for ONU1 5106. Laser beam 565 is transmitted through phase modulator PM1 506. A second downstream data stream is encoded by differential phase shift key (DPSK) modulation scheme. The DPSK encoded downstream data is carried on RF drive signal 5303, which is used to modulate the phase of PM1 506. The output of PM1 506 is laser beam 567, which carries the DPSK encoded downstream data for ONU1 5106. Similarly, laser beam 5101 is intensity modulated by intensity modulator IM2 550 to yield laser beam 5103, which carries the OOK encoded downstream data for ONU2 554. Laser beam 5105 is phase modulated by phase modulator PM2 552 to yield laser beam 5107, which carries the DPSK encoded downstream data for ONU2 554.

Laser beam 563, laser beam 567, laser beam 5103, and laser beam 5107 are multiplexed by multiplexer MUX 508. The output of MUX 508 is multi-wavelength ($\lambda_1+\lambda_2+\lambda_3+\lambda_4$) laser beam 569, which is amplified by erbium doped fiber amplifier EDFA 510. The amplified laser beam 571 is transmitted across optical fiber 5202 to optical interleaver IL 512, located in remote node 5104. Optical interleaver IL 512 demultiplexes laser beam 571 into two laser beams. Laser beam 573 carries the odd channels ($\lambda_1+\lambda_3$), and laser beam 577 carries the even channels ($\lambda_2+\lambda_4$). Laser beam 573 is transmitted to demultiplexer DEMUX 514, which demultiplexes laser beam 573 into two laser beams, one with wavelength $\lambda_1$ and one with wavelength 3. Laser beam 575 ($\lambda_1$) is transmitted from DEMUX 514 to OOK receiver 518, located in ONU1 5106. OOK receiver 518 decodes the OOK encoded downstream data. Returning to DEMUX 514, laser beam 5111 ($\lambda_3$) is similarly transmitted to an OOK Rx (not shown) in ONU2 554.

Laser beam 577 is transmitted to demultiplexer DEMUX 516, which demultiplexes laser beam 577 into two laser beams, one with wavelength $\lambda_2$ and one with wavelength $\lambda_4$. Laser beam 579 ($\lambda_2$) is transmitted from DEMUX 516 to optical splitter 520, located in ONU1 5106. Optical splitter 520 splits laser beam 579 into laser beam 581 and laser beam 583. Laser beam 581 is transmitted to DPSK receiver 522, located in ONU1 5106. DPSK receiver 522 decodes the DPSK encoded downstream data. Returning to DEMUX 516, laser beam 5113 ($\lambda_4$) is similarly transmitted to an optical splitter (not shown) in ONU2 554.

Laser beam 583 is transmitted to optical circulator OC 524. An optical circulator is a directional optical beam steering component. In a 3-port optical circulator, a laser beam injected into port 1 is output from port 2, and a laser beam injected into port 2 is output from port 3. Laser beam 583 is injected into port 1 of OC 524. Laser beam 585 is output from port 2 and transmitted to reflective semiconductor optical amplifier RSOA 526. Upstream data from ONU1 5106 is OOK encoded. The OOK encoded upstream data is carried on RF drive signal 5305, which modulates the gain of RSOA 526. Since RSOA 526 remodulates the $\lambda_2$ optical carrier received from laser beam 585, a laser transmitter with a highly stabilized wavelength is not required in ONU1 5106. The cost of ONU1 5106 is thereby reduced.

Laser beam 587, which carries the OOK encoded upstream data, is output from RSOA 526 and injected into port 2 of OC 524. Laser beam 591 is output from port 3 of OC 524 and transmitted to multiplexer MUX 530, located in remote node 5104. Similarly, laser beam 5109 ($\lambda_4$), which carries the OOK encoded upstream data from ONU2 554 is transmitted to MUX 530.

The output of MUX 530 is multi-wavelength ($\lambda_2+\lambda_4$) laser beam 593, which is transmitted across optical fiber 5204 to demultiplexer DEMUX 532, located in central office 5102. Demultiplexer DEMUX 532 demultiplexes multi-wavelength laser beam 593 into two single wavelength laser beams. Laser beam 595 ($\lambda_2$) is transmitted to OOK receiver1 534, which decodes OOK encoded upstream data from ONU1 5106. Similarly, laser beam 597 ($\lambda_4$) is transmitted to OOK receiver2 536, which decodes OOK encoded upstream data from ONU2 554.

Note that, depending on the application, various combinations of modulation schemes may be used for transporting downstream and upstream data. Modulation schemes may also be chosen on the basis of cost vs. performance. On/off keying signals can be directly detected, so the transceiver (transmitter and receiver) may be inexpensive. More sophisticated modulation schemes, such as differential phase shift key (DPSK), may provide some other benefit, such as the signal can be re-modulated, but, they need another optical component, such as demodulator, to convert phase signal to intensity signal before it can be detected by photodiode. So, the components for DPSK, however, are more expensive. Note that intensity modulation and phase modulation schemes may be used for both downstream and upstream channels. In the embodiment shown in FIG. 5, two downstream channels are allocated per ONU to provide high downstream bandwidth. One downstream channel is modulated with OOK to reduce costs. The optical carrier for the second downstream channel is reused for the upstream channel. In this instance, DPSK modulation is used because the optical intensity of the optical carrier is maintained at a constant value. OOK modulation for the upstream channel may then be used. One skilled in the art may design transmission systems with frequency shift key (FSK), as well as other intensity, phase, and frequency modulation schemes.

Figure 6:
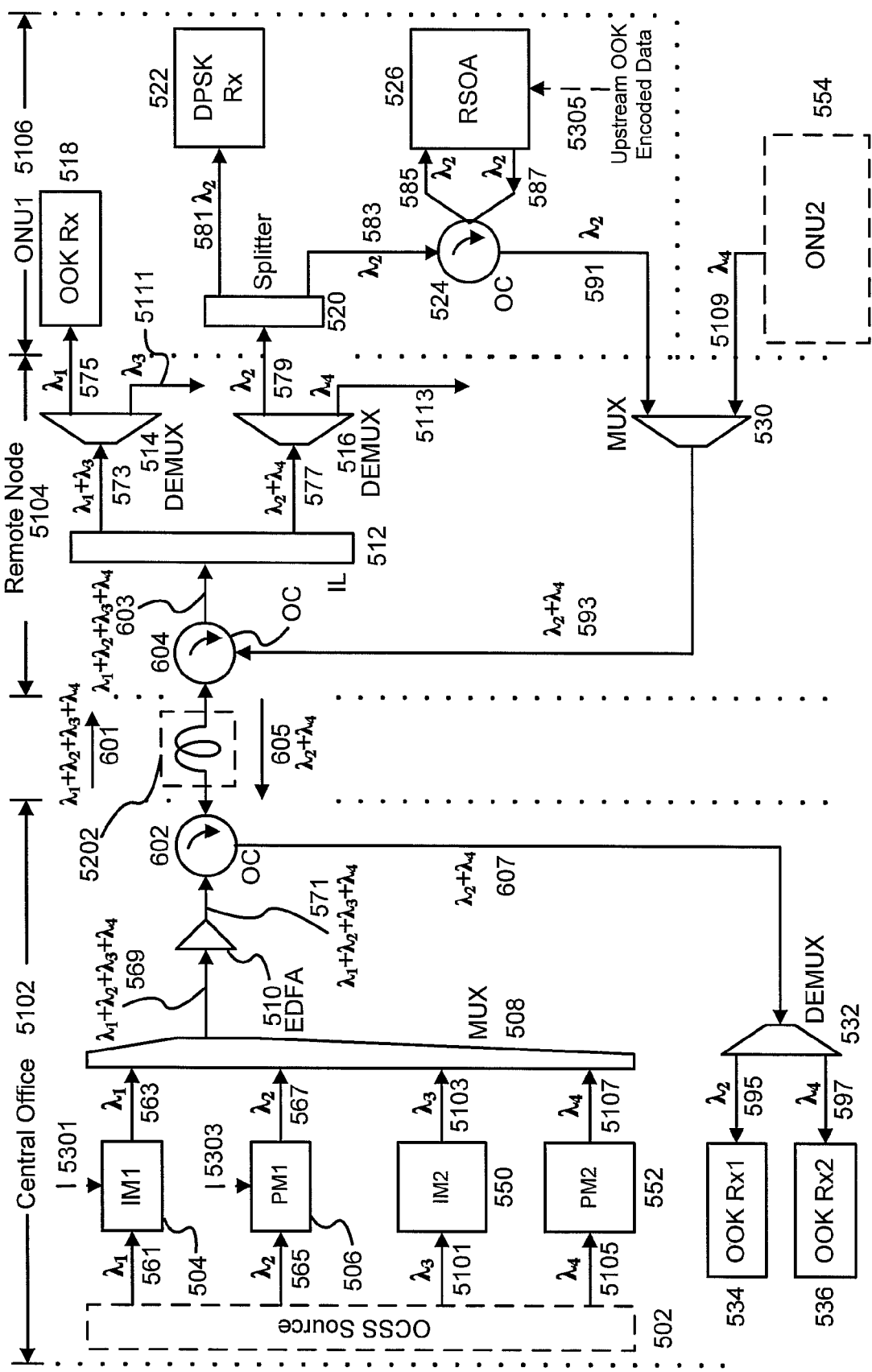
FIG. 6 shows a detailed schematic of a bi-directional wavelength division multiplex passive optical network using a single optical fiber for downstream and upstream data transport.

In the example shown in FIG. 5, the downstream data streams are transmitted across one fiber, optical fiber 5202, and the upstream data streams are transmitted across a second fiber, optical fiber 5204. In another embodiment, shown in FIG. 6, the downstream data streams and the upstream data streams share the same fiber, optical fiber 5202. In FIG. 6, the components and laser beams which are in common with FIG. 5 are labelled with the same 5XX reference numbers as in FIG. 5. New components and laser beams are labelled with 6XX reference numbers.

Optical fiber 5202 may carry both downstream and upstream data streams by introducing optical circulator OC 602 in central office 5102 and optical circulator OC 604 in remote node 5104. In the downstream direction, the amplified multi-wavelength ($\lambda_1+\lambda_2+\lambda_3+\lambda_4$) laser beam 571 from the output of EDFA 510 is injected into port 1 of OC 602. The output from port 2 of OC 602 is laser beam 601, which is then transmitted across optical fiber 5202 to OC 604, located in remote node 5104. Laser beam 601 is injected into port 2 of OC 604. The output from port 3 of OC 604 is laser beam 603, which is transmitted to optical interleaver IL 512. The rest of the optical processing in the downstream direction then proceeds as shown previously in FIG. 5.

In the upstream direction, multi-wavelength ($\lambda_2+\lambda_4$) laser beam 593, output from MUX 530, is transmitted to OC 604. Laser beam 593 is injected into port 1 of OC 604. The output from port 2 of OC 604 is laser beam 605, which is transmitted across optical fiber 5202. Laser beam 605 is injected into port 2 of OC 602. The output from port 3 of OC 602 is laser beam 607, which is then transmitted to demultiplexer DEMUX 532. The rest of the optical processing in the upstream direction then proceeds as previously shown in FIG. 5.

Figure 7A:
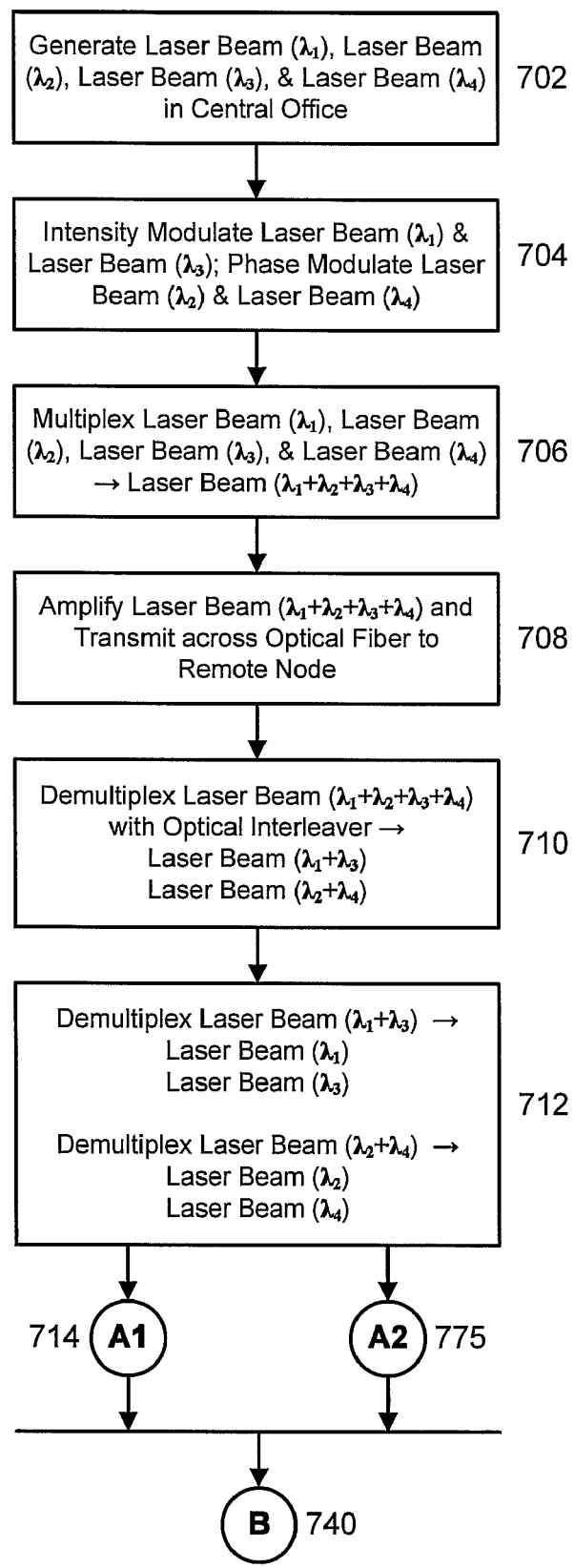
FIG. 7(a)-FIG. 7(d) show a flowchart of steps for transport of data over a bidirectional wavelength division multiplex passive optical network.

FIG. 7(a)-FIG. 7(d) show a high-level flowchart of steps which summarizes the steps for bi-directional data transport in a WDM-PON, according to the embodiment shown in FIG. 5. Referring to FIG. 7(a), in step 702, four single wavelength laser beams [laser beam 561 ($\lambda_1$), laser beam 565 ($\lambda_2$), laser beam 5101 ($\lambda_3$), and laser beam 5105 ($\lambda_4$)] are generated by an optical source [OCSS source 502] in central office 5102. Two downstream channels [laser beam 561 ($\lambda_1$), laser beam 565 ($\lambda_2$)] are assigned to ONU1 5106. Two downstream channels [laser beam 5101 ($\lambda_3$), laser beam 5105 ($\lambda_4$)] are assigned to ONU2 554.

The process then passes to step 704, in which the odd channels [laser beam 561 ($\lambda_1$), laser beam 565 ($\lambda_2$)] are intensity modulated. The intensity modulators [IM1 504, IM2 550] are driven by RF drive signals which carry OOK encoded downstream data. For example, IM1 504 is driven by RF drive signal 5301. The even channels [laser beam 565 ($\lambda_2$), laser beam 5105 ($\lambda_4$)] are phase modulated. The phase modulators [PM1 506, PM2 552] are driven by RF drive signals which carry DPSK encoded downstream data. For example, PM1 506 is driven by RF drive signal 5303.

The process then passes to step 706, in which the intensity modulated laser beams [laser beam 563, laser beam 5103] and the phase modulated laser beams [laser beam 567, laser beam 5107] are multiplexed together by a multiplexer [MUX 508] into a single multi-wavelength ($\lambda_1+\lambda_2+\lambda_3+\lambda_4$) laser beam [laser beam 569]. The process then passes to step 708, in which laser beam 569 is amplified by an erbium doped fiber amplifier [EDFA 510]. The amplified laser beam [laser beam 571] is then transmitted across optical fiber [optical fiber 5202] to a remote node [remote node 5104].

The process then passes to step 710, in which laser beam 571 is demultiplexed by an optical interleaver [IL 512]. The odd channels [$\lambda_1, \lambda_3$] are multiplexed onto a laser beam [laser beam 573], which is transmitted to a demultiplexer [DEMUX 514]. The even channels [$\lambda_2, \lambda_4$] are multiplexed onto a laser beam [laser beam 577], which is transmitted to a separate demultiplexer [DEMUX 516].

The process then passes to step 712. Laser beam 573 is demultiplexed by DEMUX 514 into two laser beams, one with wavelength $\lambda_1$ [laser beam 575] and one with wavelength $\lambda_3$ [laser beam 5111]. Laser beam 577 is demultiplexed by DEMUX 516 into two laser beams, one with wavelength $\lambda_2$ [laser beam 579] and one with wavelength $\lambda_4$ [laser beam 5113].

Figure 7B:
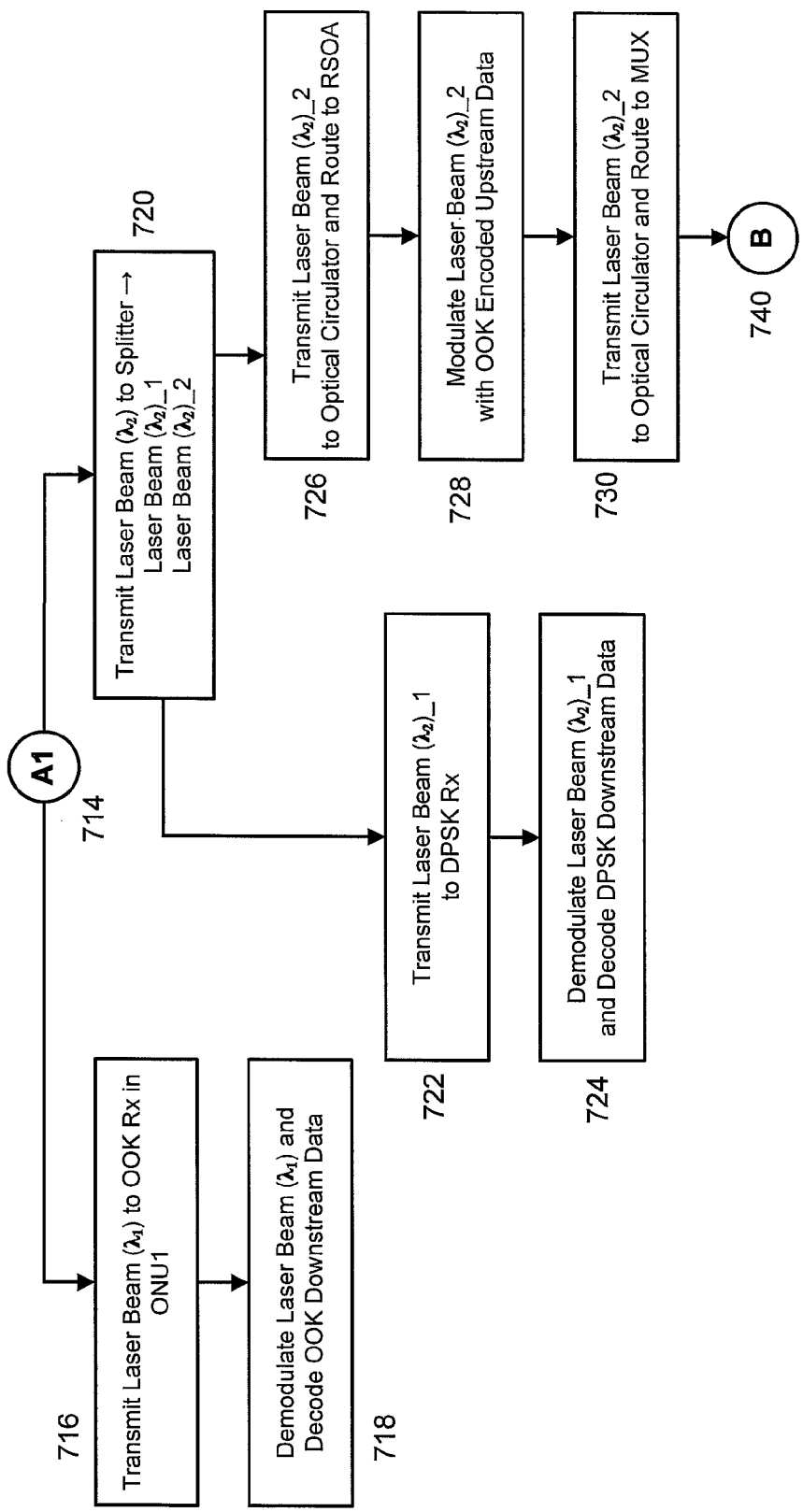
Figure 7C:
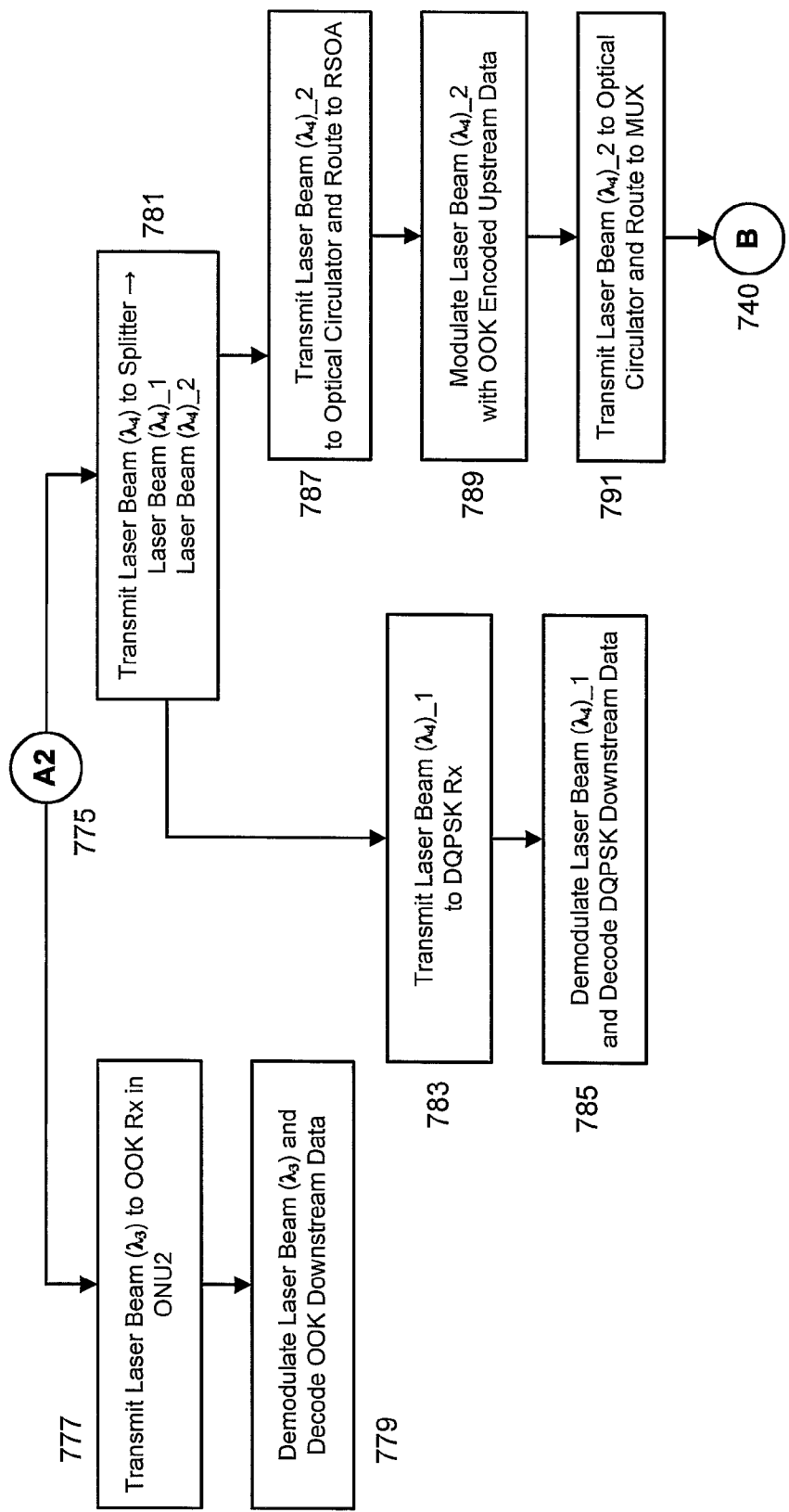

The process then splits into two sub-processes, one for ONU1 5106, and the corresponding one for ONU2 554. The sub-process for ONU1 5106 is described in the sequence of steps from marker A1 714 to marker B 740 in FIG. 7(a). These steps are shown in FIG. 7(b), and are discussed in detail below. The corresponding sub-process for ONU2 554 are described in the sequence of steps from marker A2 775 to marker B 740. These steps are shown in FIG. 7(c). These steps are not discussed in detail. Only the key results are highlighted.

Referring to FIG. 7(b), the sub-process for ONU1 5106 is further divided into two branches. In the first branch, in step 716, laser beam 575 ($\lambda_1$) is transmitted to an OOK receiver [OOK receiver 518]. In step 718, OOK receiver 518 demodulates laser beam 575 and decodes the downstream data. In the second branch, in step 720, laser beam 579 ($\lambda_2$) is transmitted to an optical splitter [optical splitter 520], which splits laser beam 579 into two laser beams: laser beam ($\lambda_2$)_1 [laser beam 581] and laser beam ($\lambda_2$)_2 [laser beam 583]. The two laser beams are processed separately, as described below.

In step 722, laser beam 581 is transmitted to a DPSK receiver [DPSK receiver 522], which, in step 724, demodulates laser beam 581 and decodes the downstream data. In step 726, laser beam 583 is transmitted to an optical circulator [OC 524] and routed as laser beam 585 to a reflective semiconductor optical amplifier [RSOA 526]. In step 728, laser beam 585 is modulated by upstream OOK encoded data carried on an RF drive signal [RF drive signal 5305] which modulates the gain of RSOA 526. In step 730, the upstream laser beam [laser beam 587] is transmitted to OC 524 and routed as laser beam 591 to a multiplexer [MUX 530], located in remote node 5104.

In FIG. 7(c), the corresponding sequence of steps for ONU2 554 is shown. Step 777-step 791 correspond to step 716-step 730, except that the wavelengths assigned to ONU2 554 are $\lambda_3$ and $\lambda_4$. In step 791, the upstream laser beam [laser beam 5109] is routed to MUX 530.

Figure 7D:
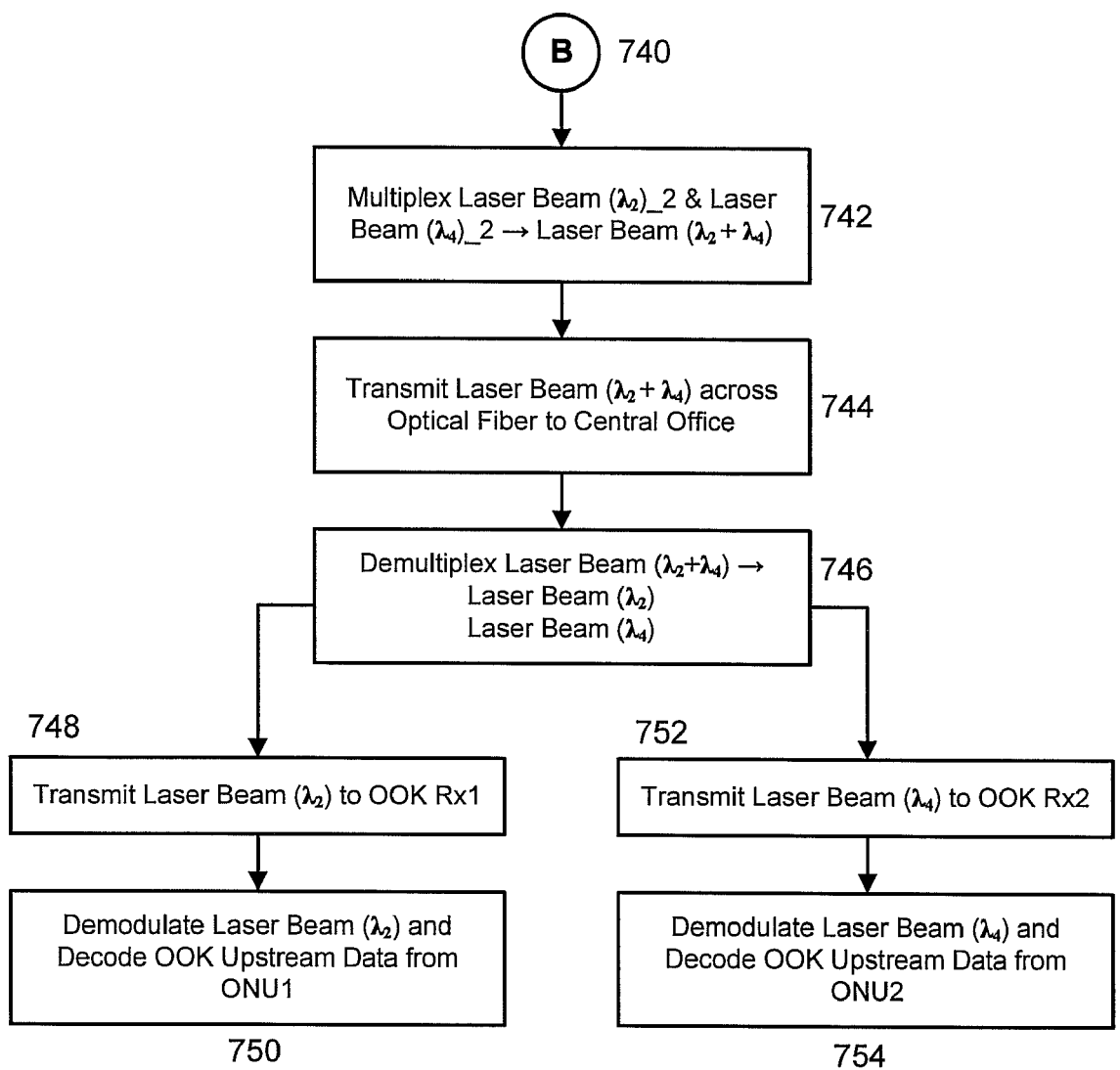

Referring to FIG. 7(a) and FIG. 7(d), after the sequence of steps from marker A1 714 to marker B 740 have been completed for ONU1 5106, and after the sequence of steps from marker A2 775 to marker B 740 have been completed for ONU2 554, the process passes to step 742 in FIG. 7(d). In step 742, the upstream laser beam [laser beam 591 ($\lambda_2$)] from ONU1 5106 and the upstream laser beam [laser beam 5109 ($\lambda_4$)] from ONU2 554 are multiplexed by MUX 530 to form a multi-wavelength ($\lambda_2+\lambda_4$) laser beam [laser beam 593]. In step 744, laser beam 593 is transmitted across an optical fiber [optical fiber 5204] to central office 5102.

In step 746, laser beam 593 is demultiplexed by a demultiplexer [DEMUX 532] into two single wavelength laser beams, one with wavelength $\lambda_2$ [laser beam 595] and one with wavelength $\lambda_4$ [laser beam 597]. In step 748, laser beam 595 is transmitted to an OOK receiver [OOK receiver1 534], which, in step 750, demodulates laser beam 595 and decodes the upstream data from ONU1 5106. In step 752, laser beam 597 is transmitted to an OOK receiver [OOK receiver2 536], which, in step 754, demodulates laser beam 597 and decodes the upstream data from ONU2 554.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transmitting and receiving data across a wavelength division passive optical network, comprising the steps of:
   generating a first laser beam having a first wavelength;
   generating a second laser beam having a second wavelength;
   modulating said first laser beam with first downstream data;
   modulating said second laser beam with second downstream data, wherein said modulated second laser beam has a constant intensity;
   multiplexing said modulated first laser beam and said modulated second laser beam into a multiplexed laser beam;
   transmitting said multiplexed laser beam;
   receiving said multiplexed laser beam;
   demultiplexing said multiplexed laser beam into a third laser beam having said first wavelength and modulated with said first downstream data and a fourth laser beam having said second wavelength and modulated with said second downstream data;
   receiving said third laser beam at a first receiver;
   splitting said fourth laser beam into a fifth laser beam and a sixth laser beam;
   receiving said fifth laser beam at a second receiver;
   modulating said sixth laser beam with upstream data;
   transmitting said modulated sixth laser beam; and
   receiving said modulated sixth laser beam at a third receiver.

2. The method of claim 1, wherein said step of generating a first laser beam having a first wavelength and said step of generating a second laser beam having a second wavelength further comprise the step of:
   generating said first laser beam and said second laser beam by optical carrier suppression and separation.

3. The method of claim 1, wherein said step of modulating said first laser beam with first downstream data further comprises the step of:
   modulating said first laser beam by on/off key modulation.

4. The method of claim 1, wherein said step of modulating said first laser beam with first downstream data further comprises the step of:
   modulating said first laser beam by differential phase shift key modulation.

5. The method of claim 1, wherein said step of modulating said second laser beam with second downstream data further comprises the step of:
   modulating said second laser beam by differential phase shift key modulation.

6. The method of claim 1, wherein said step of modulating said sixth laser beam with upstream data further comprises the step of:
   modulating said sixth laser beam with on/off key modulation.

7. The method of claim 1, wherein said step of modulating said sixth laser beam further comprises the step of:
   modulating said sixth laser beam with a reflective semiconductor optical amplifier.

8. The method of claim 1, wherein said step of modulating said sixth laser beam and said step of transmitting said modulated sixth laser beam further comprise the steps of:
- receiving said sixth laser beam at a reflective semiconductor optical amplifier;
- modulating said sixth laser beam by said reflective semiconductor optical amplifier; and
- reflecting said modulated sixth laser beam by said reflective semiconductor optical amplifier.

9. A wavelength division multiplex passive optical network comprising,
- a central optical system further comprising:
  - an optical source adapted to generate a first laser beam having a first wavelength and a second laser beam having a second wavelength;
  - a first optical modulator adapted to modulate said first laser beam with first downstream data;
  - a second optical modulator adapted to modulate said second laser beam with second downstream data, wherein said modulated second laser beam has a constant intensity;
  - a multiplexer adapted to multiplex said modulated first laser beam and said modulated second laser beam into a multiplexed laser beam; and
  - a first receiver adapted to receive an upstream laser beam having said second wavelength, said upstream laser beam modulated with upstream data, wherein said upstream laser beam is based at least in part on said modulated second laser beam;
- a remote node further comprising:
  - a demultiplexer adapted to receive said multiplexed laser beam; adapted to demultiplex said multiplexed laser beam into a third laser beam having said first wavelength and modulated with said first downstream data and a fourth laser beam having said second wavelength and modulated with said second downstream data; and adapted to transmit said third laser beam and said fourth laser beam; and
- an optical network unit further comprising:
  - a second receiver adapted to receive said third laser beam;
  - a splitter adapted to split said fourth laser beam into a fifth laser beam and a sixth laser beam;
  - a third receiver adapted to receive said fifth laser beam;
  - a third modulator adapted to modulate said sixth laser beam with upstream data; and
  - a reflector adapted to reflect said sixth laser beam modulated with said upstream data to generate said upstream laser beam.

10. The wavelength division multiplex passive optical network of claim 9, wherein said optical source further comprises:
- an optical carrier suppression and separation source.

11. The wavelength division multiplex passive optical network of claim 9, wherein said first optical modulator further comprises:
- an optical intensity modulator adapted to modulate said first laser beam with on/off key modulation.

12. The wavelength division multiplex passive optical network of claim 9, wherein said first optical modulator further comprises:
- an optical phase modulator adapted to modulate said first laser beam with differential phase shift key modulation.

13. The wavelength division multiplex passive optical network of claim 9, wherein said second optical modulator further comprises:
- an optical phase modulator adapted to modulate said second laser beam with differential phase shift key modulation.

14. The wavelength division multiplex passive optical network of claim 9, wherein said first receiver further comprises:
- an on/off key receiver.

15. The wavelength division multiplex passive optical network of claim 9, wherein said second receiver further comprises:
- an on/off key receiver.

16. The wavelength division multiplex passive optical network of claim 9, wherein said second receiver further comprises:
- a differential phase shift key receiver.

17. The wavelength division multiplex passive optical network of claim 9, wherein said third receiver further comprises:
- a differential phase shift key receiver.

18. The wavelength division multiplex passive optical network of claim 9, wherein said third optical modulator further comprises:
- an optical intensity modulator adapted to modulate said sixth laser beam with on/off key modulation.

19. The wavelength division multiplex passive optical network of claim 9, wherein said modulator adapted to modulate said sixth laser beam further comprises:
- a reflective semiconductor optical amplifier.

20. The wavelength division multiplex passive optical network of claim 9, wherein said reflector adapted to reflect said modulated sixth laser beam further comprises:
- a reflective semiconductor optical amplifier.

* * * * *